United States Patent [19]

Kroll et al.

[11] 4,232,596
[45] Nov. 11, 1980

[54] LOW HEAT CAPACITY FRY BASKET ASSEMBLY

[75] Inventors: Steve Kroll, Schaumburg; James C. Schindler, Naperville, both of Ill.

[73] Assignee: Restaurant Technology, Inc., Oak Brook, Ill.

[21] Appl. No.: 964,789

[22] Filed: Nov. 29, 1978

[51] Int. Cl.³ .................................................. A47J 37/12
[52] U.S. Cl. .................................... 99/410; 99/407; 99/448; 99/450; 211/10; 220/23.2; 312/184; 224/45 R; 224/49
[58] Field of Search ............... 224/48 R, 48 W, 46 R; 99/403, 450, 410, 411, 413, 414, 367, 347, 448, 393, 394, 402, 416, 426, 427; 211/60 M, 113, 119, 126, 10, 11; 206/804, 806, 139, 162, 165, 201, 202, 192, 193, 513, ; 129/16.7; 312/183, 184, 185, 297; 220/23.83, 85 B, 23.86, 23.2; 426/113–121, 438–441, 505, 523

[56] References Cited

U.S. PATENT DOCUMENTS

| Re. 16,431 | 9/1926 | Kratzer | 426/505 |
|---|---|---|---|
| 1,221,725 | 4/1917 | Haigh | 220/23.2 |
| 1,266,912 | 5/1918 | Bradbury | 99/403 X |
| 3,081,174 | 3/1963 | Gay | 426/113 |
| 3,424,596 | 1/1969 | Sullivan | 426/113 |
| 3,517,606 | 6/1970 | Myles et al. | 211/181 X |
| 3,615,712 | 10/1971 | Keller | 426/113 |
| 3,866,788 | 2/1975 | Smit | 206/513 |
| 4,001,966 | 1/1977 | Metzner | 220/23.2 X |

FOREIGN PATENT DOCUMENTS 323006  8/1957  Switzerland ............... 312/184

Primary Examiner—Robert J. Spar
Assistant Examiner—Jerold M. Forsberg
Attorney, Agent, or Firm—Dressler, Goldsmith, Shore, Sutker & Milnamow, Ltd.

[57] ABSTRACT

A fry basket for supporting food items, such as pies and fish filets, to be cooked in an immersed position in a cooking medium. The fry basket has a generally rigid frame presenting parallel, spaced-apart transverse support members. A unitary sheet of low heat capacity flexible material is supported from the transverse frame members to form a plurality of pouches. Each pouch has a pair of opposed sidewalls and a bottom portion with each of the sidewalls of each pouch hanging from a transverse frame member of define, together with the pouch bottom portion, a pouch having a generally U-shaped cross-sectional configuration.

9 Claims, 5 Drawing Figures

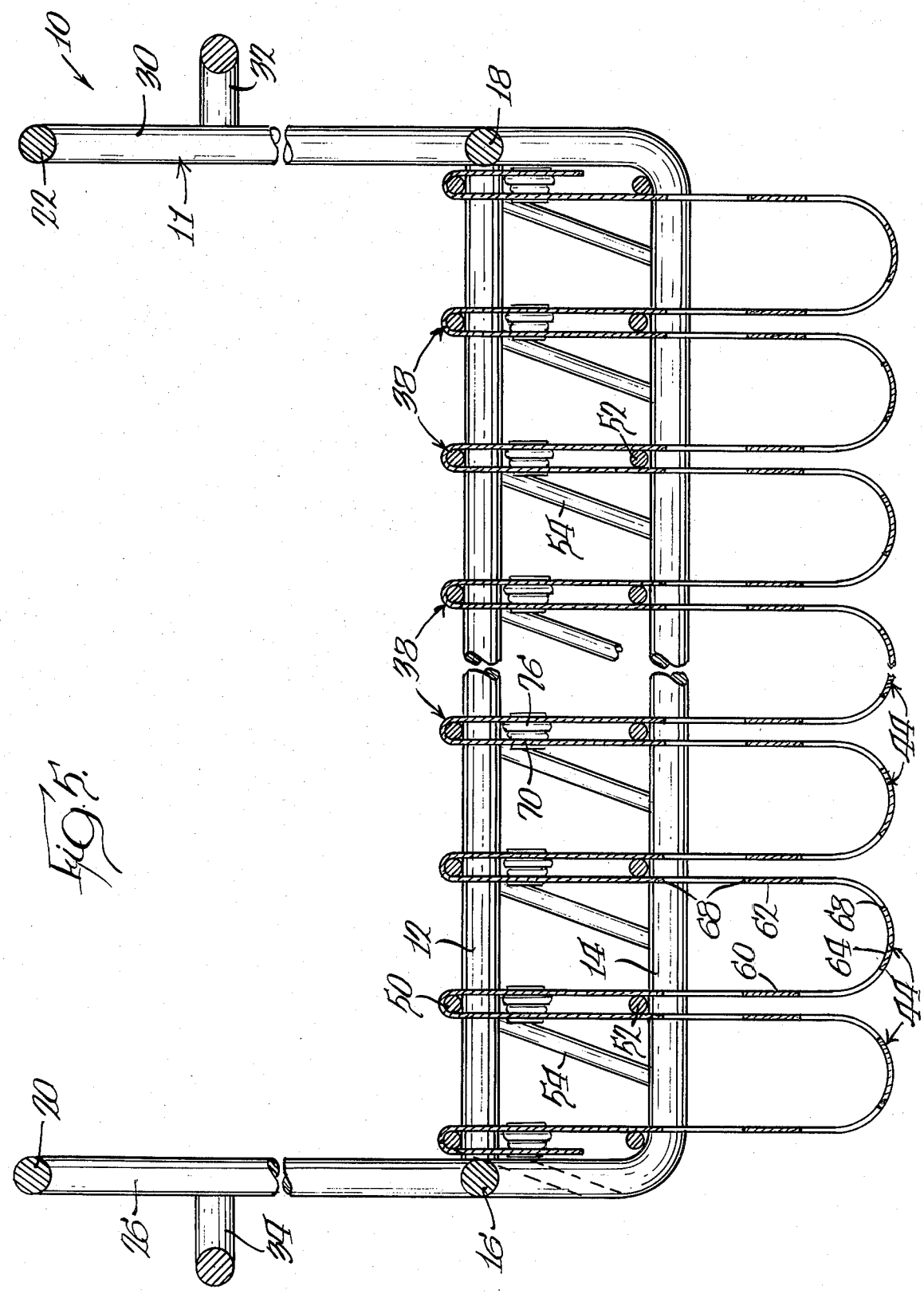

LOW HEAT CAPACITY FRY BASKET ASSEMBLY

BACKGROUND OF THE INVENTION

Fry baskets are used to support food in a cooking medium, which is generally a liquid medium, with the food immersed therein. Usually where food is prepared and cooked by deep fat frying, a fry basket is immersed in the hot fat to the point where the food is completely covered by the fat.

Fry baskets have been developed for use with individual serving portions of various types of food, such as pie pieces or fish filets, wherein a plurality of compartments are provided for holding the food distributed in the basket with one serving portion to a compartment.

In the past, types of fry baskets described above have been constructed from stainless steel or other types of metal. It has been found that construction of these types of fry baskets from steel or other metal has certain disadvantages. For example, compared to many other materials that might possibly be used, the metal basket generally weighs more and thus is more difficult to handle. Metal also tends to stick to many food products. Further, an all metal basket has a greater potential for marring, scratching, or denting surfaces which it contacts. Also of considerable importance with today's high energy costs, an all metal basket has a relatively high heat capacity and therefore absorbs some of the heat from the cooking liquid. Heat absorbed by the metal basket is not absorbed by the food and is therefore wasted. It would be more desirable to direct as much heat from the cooking liquid as possible to the food items to be cooked rather than to the fry basket.

SUMMARY OF THE INVENTION

The instant invention is a low heat capacity fry basket assembly for holding a plurality of comestible articles in spaced apart relationship when immersed in a bath of cooking liquid. In the preferred embodiment, the basket has a substantially rigid peripheral framework, of metal or some other suitable rigid material, for supporting a plurality of non-metallic pouches adapted to receive and hold the comestible articles. Preferably, the pouches are formed from a sheet of low heat capacity, flexible material supported at spaced locations along its length by a plurality of transverse bars so that the portions of the sheet hang down to form a plurality of generally U-shaped pouches. Preferably, the flexible material has a plurality of apertures for permitting the cooking fluid to flow against the surfaces of the comestible articles in the pouches. Further, in the preferred embodiment, adjacent pouches are secured together, around each common transverse support bar, by a snap fit interlock comprising a receiving aperture and a projecting member adapted to be received in the receiving aperture.

The novel basket of the present invention thus drastically reduces the amount of energy absorbed from the cooking medium owing to the use of a low heat capacity material for forming the plurality of comestible holding pouches. Further, to the extent that the low heat capacity material is a flexible, non-metallic material, such as a synthetic resin polymer, much of the surface area of the basket, if brought into contact with adjacent surfaces, will not cause marking or scratching of those adjacent surfaces. Additionally, use of the snap fit interlock construction to hold the flexible pouch material onto the generally rigid framework permits the flexible pouch material to be easily and completely removed from the framework whereby the pouch material can be stretched out to a generally flat configuration and thoroughly and easily cleaned.

Use of a relatively low density synthetic resin polymer to form the comestible holding pouches in the basket of the present invention provides a basket which weighs less than an all-metallic basket. This permits easier handling by the operator.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification and in which like numerals are employed to designate like parts throughout the same.

FIG. 5 is a cross-sectional view taken generally along the plane 5—5 of FIG. 2.

DESCRIPTION OF THE PREFERRED EMBODIMENT

Figure 1:
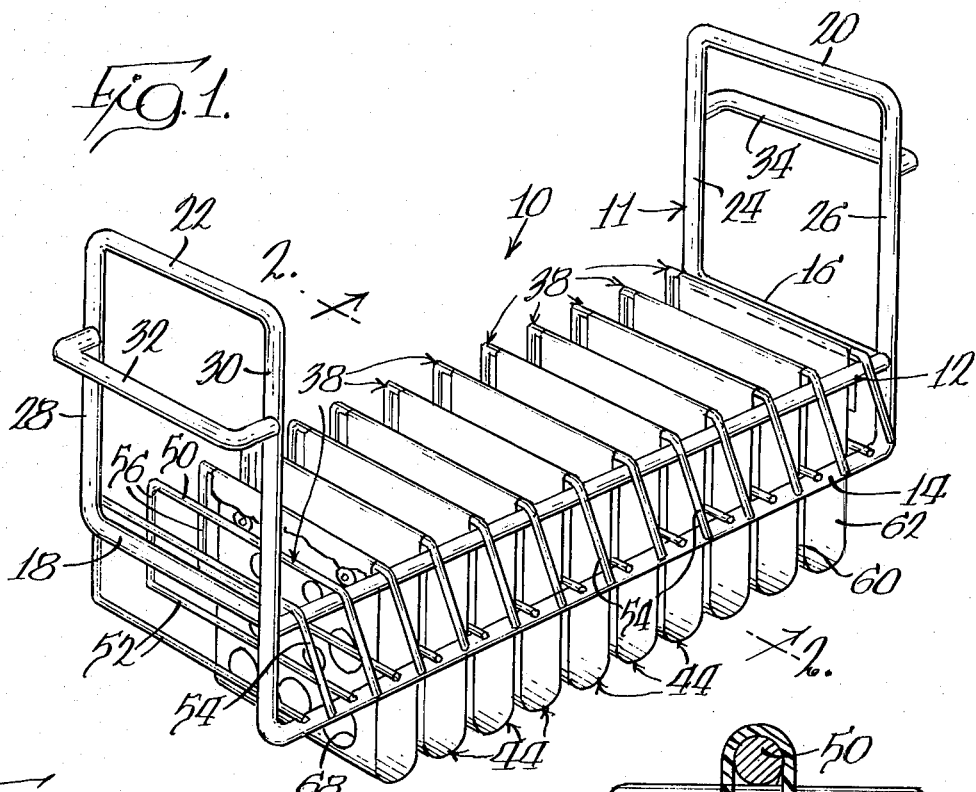
FIG. 1 is a perspective view of a fry basket in accordance with this invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with only reference to an embodiment which is simple and straightforward.

For ease of description, the apparatus of this invention will be described in a normal operation position, and terms such as upper, lower, horizontal, etc., will be used with reference to this normal operating position. It will be understood, however, that the apparatus of this invention may be manufactured, stored, transported, and sold in an orientation other than the normal operation position described.

Referring now to FIG. 1, the frying basket of the present invention is designated generally as 10 therein. The basket has a generally rigid frame 11 which may be made from stainless steel rod or other suitable metallic or non-metallic material. The frame 11 comprises upper side bar 12, lower side bar 14, bottom end bars 16 and 18, upper end top bars 20 and 22, a first pair of vertical end bars 24 and 26, a second pair of vertical end bars 28 and 30, basket support bars 32 and 34, and a plurality of pouch support frames 38.

The upper end bars 20 and 22 serve as handles by which an operator may carry the basket 10 and insert it into a deep fat fryer (not illustrated) wherein the basket 10 is supported at each end on horizontal support ledges of the deep fat fryer by means of support bars 32 and 34.

The basket has a plurality of non-metallic pouches 44 for receiving and holding comestible articles. The pouches 44 are supported by the pouch support frames 38. Each of the pouch support frames 38, as best illustrated in FIGS. 1 and 5, preferably have an upper transverse support member 50, a lower transverse member 52, and an angled side member 54. Further, the upper transverse member 50 and lower transverse member 52 are preferably joined by a vertical side member 56 as best illustrated in FIG. 1.

The pouches 44 are preferably formed from a single, generally rectangular sheet of non-metallic, flexible material which is hung over each of the upper transverse members 50 to form a plurality of generally U-shaped pouches. As best illustrated in FIG. 5, the pouches 44 have a pair of opposed sidewalls 60 and 62 and a bottom portion 64 which together form a U-shaped configuration with an opening towards the top of the pouch.

Figure 2:
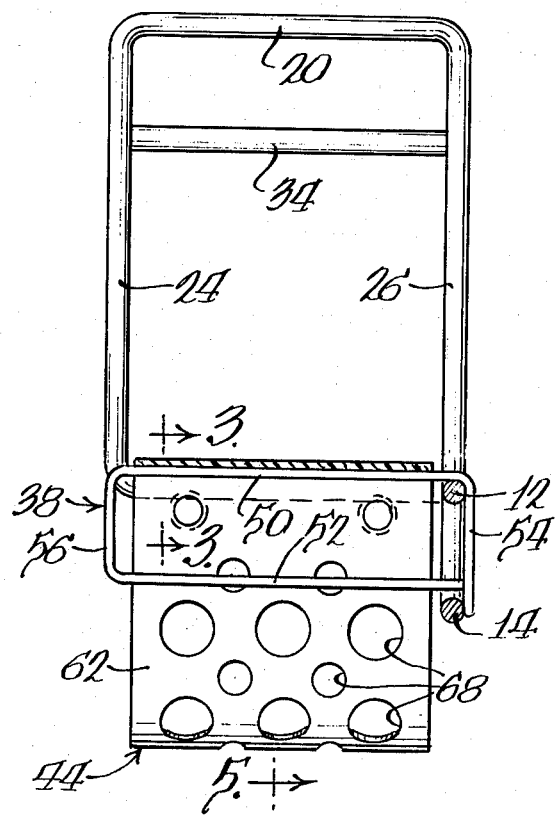
FIG. 2 is a cross-sectional view taken generally along the plane 2—2 in FIG. 1.

Preferably, as best illustrated in FIGS. 1 and 2, the flexible material has a plurality of apertures 68 to admit the cooking liquid into the pouches through the opposed sidewalls 60 and 62 to ensure adequate liquid/comestible surface contact. In furtherance of this objective, the lower transverse members 52 are seen to be disposed between the sidewalls 60 and 62 of each adjacent pair of pouches so as to keep the pouches 38 separated during immersion in the bath of cooking liquid.

Preferably, the flexible material used for the pouches 44 is a non-stick synthetic resin polymer such as a fluorinated hydrocarbon. A preferred material is polytetrafluoroethylene, such as a product sold under the trademark Teflon. Such a material has a relatively low heat capacity compared to metal, especially as compared to the stainless steel typically used for metal fry baskets. Further, food does not stick to it as it does to metal.

Figure 3:
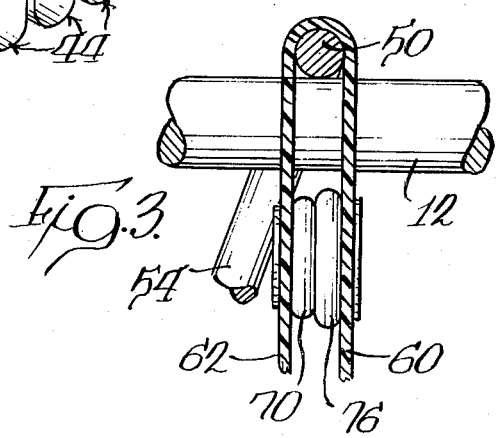
FIG. 3 is a fragmentary, cross-sectional view taken generally along the plane 3—3 in FIG. 2.
Figure 4:
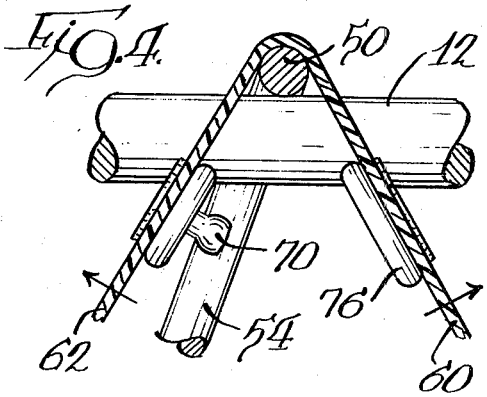
FIG. 4 is a view similar to FIG. 3 but showing walls of adjacent pouches disconnected and moved away from each other.

Preferably adjacent pouches 44 are releasably secured together at their sidewalls as best illustrated in FIGS. 3 and 4. The sidewall 62 of one pouch carries a projecting member 70 and the opposed wall 60 of an adjacent pouch carries a receiving member 76 having a generally resilient wall means structure defining a receiving aperture therein (not illustrated). The projecting member 70 can be moved against the resilient wall means of the receiving member 76 and forced into the aperture of the receiving member 76 to form a snap fit interlock. Snap fit interlocks of the type described above are well known, and a further discussion of the details of such structures and of their operation are not necessary here except to point out that many different types of well-known snap fit interlock structures may be used with the present invention to achieve the objective of releasably locking opposed walls of adjacent pouches together around the upper transverse support member 50.

The use of a releasable, snap fit interlock structure discussed above keeps the pouches 44 from being disengaged from the basket framework and further, upon release of the snap fit members 70 and 76, permits the entire sheet of flexible pouches 44 to be removed from the framework when desired. When the sheet of pouches 44 is removed from the framework, the sheet may be stretched out and easily cleaned. Further, the supporting rigid framework may then be easily cleaned also since the removal of the pouches permits greater access to the various frame members.

With the novel fry basket of the present invention, comestible articles, such as fish filets, may be easily inserted into the pouches 44 either from the above or from the side of the basket (opposite the upper side frame member 12 and lower side frame member 14). The articles are retained against accidental discharge by the lower side frame member 14 and by the angled side members 54 on one side.

After the comestible articles have been cooked, the basket 10 may be removed from the cooking medium and the comestible articles may be allowed to drop out of the basket 10 by tilting the basket at a slight angle.

Although the baskets 44 are illustrated as being formed from a single, unitary sheet of flexible material, it is to be understood that the baskets 44 may be formed of separate sheets of low heat capacity material and may be separately secured to a suitable framework.

In addition, it is possible to make the rigid framework out of a non-metallic, low heat capacity material, such as a synthetic resin polymer, to further reduce the overall heat absorption characteristic of the fry basket.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A low heat capacity fry basket assembly for holding a plurality of comestible articles in a spaced apart relationship when immersed in a bath of cooking liquid, said assembly comprising:
   a rigid frame having spaced-apart transverse support members;
   a non-metallic, flexible sheet forming pouches hanging from said support members for receiving and holding said comestible articles, each said pouch having at least a pair of opposed sidewalls and a bottom portion together defining said pouch with open ends and an open top, said sidewalls having a plurality of apertures therein to admit said cooking liquid into said pouch; and
   means maintaining the opposed side walls of at least two adjacent pouches in closely spaced relationship.

2. The apparatus in accordance with claim 1 in which said frame has handles by which the frame and pouches may be lifted and tilted for discharging the cooked articles.

3. The apparatus in accordance with claim 2 in which said frame has retaining means disposed along ends of said plurality of pouches to prevent accidental discharge of said comestible item from said pouch ends.

4. The apparatus in accordance with claim 2 in which said generally rigid frame includes a generally rigid member disposed between the sidewalls of an adjacent pair of pouches to keep said pouches separated during immersion in a bath of cooking liquid.

5. The apparatus in accordance with claim 1 in which said pouches are formed of a synthetic resin polymer.

6. The apparatus in accordance with claim 5 in which said pouches are formed of a fluorinated hydrocarbon polymeric material.

7. The apparatus in accordance with claim 1 in which portions of said sheet of generally flexible material are hung over each of said transverse members to form a plurality of generally U-shaped pouches.

8. A low heat capacity fry basket assembly for holding a plurality of comestible articles in a spaced apart relationship when immersed in a bath of cooking liquid, said assembly comprising:

a generally rigid frame having upper transverse members;

a plurality of non-metallic pouches for receiving and holding said comestible articles, said pouches formed from a continuous sheet of non-metallic, flexible material that is hung over at least some of said transverse members to form a plurality of generally U-shaped pouches, each said pouch having at least a pair of opposed sidewalls and a bottom portion together defining said pouch with open ends and an open top, said sidewalls having a plurality of apertures therein to admit said cooking liquid into said pouch, said sheet of non-metallic, flexible material having (A) a plurality of spaced apart receiving members each having a generally resilient wall means structure defining a receiving aperture therein and (B) a plurality of spaced apart projecting members adapted to be forced against said resilient wall means structure of said receiving members to allow the entry of said projecting members into said receiving member apertures in a snap fit interlock when the flexible sheet is supported from said frame to form said plurality of U-shaped pouches so that each of the spaced apart receiving members is aligned with an adjacent projecting member.

9. A low heat capacity fry basket assembly for holding a plurality of comestible articles in a spaced apart relationship when immersed in a bath of cooking liquid, said assembly comprising:

a generally rigid frame; a plurality of pouches formed of a single sheet of a generally flexible non-metallic, non-stick material supported from said frame, said frame including a plurality of generally rigid pouch support members, each said pouch having a pair of opposed sidewalls and a bottom portion, each of said sidewalls of each pouch hanging from a pouch support member of said frame to define, together with said pouch bottom portion, a pouch having a generally U-shaped cross-sectional configuration with open ends and an open top; and releasable locking means joining the opposed side walls of at least two adjacent pouches together around one of said support members.

* * * * *